TELEVISION APPARATUS

Filed March 20, 1953

INVENTOR.
Sidney L. Bendell
BY [signature]
ATTORNEY

United States Patent Office 2,801,385
Patented July 30, 1957

2,801,385

TELEVISION APPARATUS

Sidney L. Bendell, Camden, N. J., assignor to Radio Corporation of America, a corporation of Delaware Application March 20, 1953, Serial No. 343,761

The terminal fifteen years of the term of the patent to be granted has been disclaimed 6 Claims. (Cl. 324—20)

The present invention relates to the recording of television images or the like on photographic motion picture film through the agency of apparatus known in the art as "kinescope recording."

More particularly, the invention relates to means for providing new and improved kinescope recording techniques whereby the person in charge of the operation may calibrate the recording kinescope in a quick, yet effective, manner.

As those skilled in the art understand, one mode of recording on photographic film the image appearing on the face of a television kinescope tube is that of imaging the television picture through a suitable optical system onto the film which may, in a conventional manner, be carried past the image location by means of well known photographic camera apparatus. It is, however, extremely important, in the proper recording of television images, to calibrate or set certain of the kinescope controls in order to compensate for non-linear light output of the kinescope, and the like. Moreover, in addition to compensation for the "dynamic" transfer characteristics of the tube, the tonal values of the video signal must be properly impressed upon the film in order for the recording to produce satisfactory results. Thus, for example, the "background" control of the kinescope which may, by way of illustration, comprise a variable D. C. (direct current) setting or bias for the kinescope control electrode must be balanced against the capacity of the film to reproduce the same. Another vital point is that of accurately setting the "contrast" control which is, in the usual sense, means for varying the amplitude of the signal impressed upon the kinescope control electrode, so that the proper tone values of the television image may, in fact, be faithfully reproduced in the photographic emulsion of the film.

It has been known in the art of television image recording that the dynamic transfer characteristic of the specific kinescope employed as the television image-reproducing device may be taken into account by "predistorting" the television signal to compensate for any non-linearity of such characteristics in order to provide a resultant characteristic which possesses the desired linearity, for example. It should be noted, at this point, that, while the present invention is described herein in accordance with one of its aspects as a means for checking a recording kinescope for "linearity," the invention is equally applicable to instances wherein certain predetermined non-linearity of transfer characteristic may be the desired end result.

Since, as presently practiced, the art of kinescope recording involves physical arrangements wherein the operator is at some distance from the kinescope tube itself and, in view of the small size (perhaps 5 inch diameter) of present day recording kinescopes, the problem of determining whether the kinescope is properly focused has heretofore been rather troublesome. As will appear hereinafter, however, the present invention provides an effective solution to this problem as well as those set forth above.

In general, the present invention contemplates the modulation of a recording kinescope control electrode with a suitable low frequency test signal, such, for example, as a 60 cycle-per-second sawthooth wave. The raster appearing on the kinescope face will, with such an impressed signal, be a rectangular area gradually increasing in brightness from top to bottom, for example. The light raster is then imaged by suitable means onto a light responsive device such as a photoelectric tube and the output of the latter, after suitable amplification, is impressed upon the vertical deflection plates of a cathode ray oscilloscope, some convenient sawthooth deflection wave being applied to the horizontal deflection means of the latter. Thus, there is produced a visible reproduction on the oscilloscope face of the gradations of light emitted by the recording kinescope as a result of the test signal modulating its electrode beam intensity. The invention further contemplates the fact that the amplitude of the video signal applied to the kinescope control grid may be varied in order to bring it within desired limits in accordance with the capacity of the film used and that the D. C. bias on the kinescope grid may also be varied as necessitated by the desired background of the scenes to be recorded. Also, as will appear more fully, the present invention provides a simple but extremely efficacious "yardstick" by which the dynamic transfer characteristics of the kinescope may be determined and compensated for.

It is, therefore, a principal object of the present invention to provide means for checking or calibrating a kinescope or similar image reproducing device as a function of its dynamic transfer characteristics.

It is a further object to provide means whereby a visual indication is given of such characteristics of a kinescope.

Another object is the provision of means whereby the light sensitivity of photographic film may be conveniently accommodated through proper preliminary setting of the background and contrast controls of a recording kinescope.

A still further object of the invention is to provide means for furnishing a visual indication of the beam focus condition existing in a given kinescope, which indication is or may be available at a distance from such kinescope.

It will also be shown that the present invention affords an indication of the propriety of the persistence of the phosphors employed in a given kinescope in order that the operator may readily determine whether th decay time is within acceptable limits.

Additional objects and advantages of the invention will become apparent to persons skilled in the art from a study of the following detailed description of the accompanying drawings in which.

Figures 1, 2:
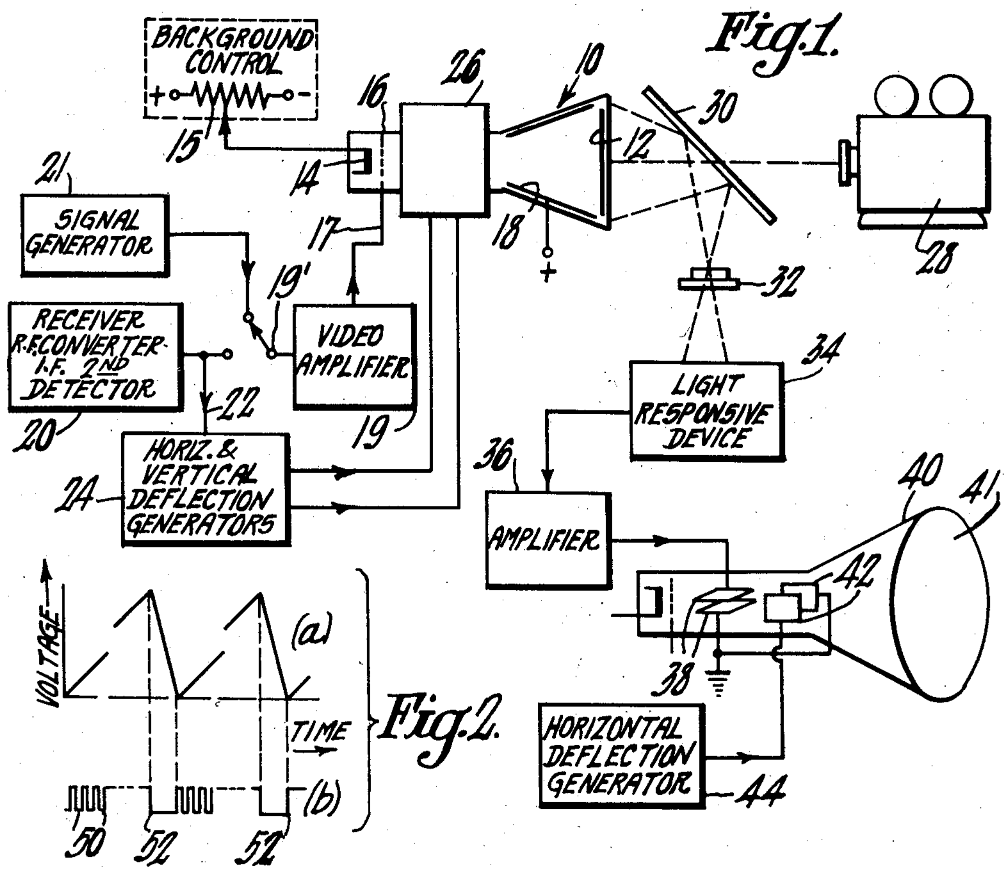
Figure 1 illustrates, by way of block diagram, an arrangement embodying the principles of the invention.
Figure 2 illustrates graphically a waveform to which reference is made hereinafter.

Referring to the drawings, and more particularly to Figure 1 thereof, reference numeral 10 indicates generally a television image reproducing device known in the art as a "kinescope," which is of a type suitably employed in image recording. Shown diagrammatically in connection therewith, the kinescope 10 includes a luminescent screen 12 of phosphor or other material adapted to emit light when bombarded by electrons.

A cathode 14, control electrode 16, and a second anode 18 which may, as shown, take the form of a coating of conductive material on the interior surface of the tube are also illustrated. The anode 18 is, as indicated diagrammatically, connected to a source of high positive potential in order to provide proper acceleration of the electron beam emitted by the cathode 14.

As is well known, the kinescope 10 may derive its beam modulating video signal from a television receiver illustrated in Figure 1 or may be connected directly to the source of video signals at the transmitting equipment. Thus, it will be appreciated that, while the invention is described here in connection with a receiver, it is equally applicable to the case in which video signals are derived in other ways. Specifically, however, the arrangement of Figure 1 indicates a receiver 20 which may be of any type known in the art including the usual R. F. (radio frequency), I. F. (intermediate frequency), and second detector stages. As is further known, the composite detected signal will include, in addition to the video information, horizontal and vertical blanking and synchronizing pulses. Through the agency of any conventional sync pulse separating circuitry (not illustrated) the sync pulses are separated from the balance of the signal as received and are conveyed via lead 22 to the horizontal and vertical deflection generators illustrated diagrammatically at 24 which have as their function that of supplying to the kinescope deflection coils 26 suitable deflecting voltages which ultimately cause cyclic deflection of the kinescope electron beam in perpendicular directions for the production of a raster on the luminescent screen 12 thereof.

Disposed between the kinescope face and the photographic motion picture camera 28 is a light reflecting device 30 which may, by way of example, be a semitransparent mirror which has as its function that of reflecting the light rays emitted by the phosphor screen 12 to an optical system indicated generally by lens 32 which images such light upon the photosensitive element of a light responsive device 34. The output of the light responsive device which may, by way of illustration, be a photoelectric tube such as RCA–931 or similar electron multiplier phototube, is amplied by means indicated at 36 and is applied between the vertical deflection plates 38 of a cathode ray oscilloscope 40. Connected to the horizontal deflection plates 42 of the oscilloscope is a source of sawtooth energy 44 which may comprise any convenient, known circuitry adapted to produce a linear sawtooth voltage.

Referring again to the kinescope 10, its cathode 14 is connected to a variable potential source 15 which is designed to illustrate any conventional type of D. C. bias on "background" control which provides a D. C. bias between the cathode and grid 16. This determines the density of the current flow in the kinescope in accordance with the positioning of the variable tap on potentiometer 15, as will be understood. Connected to the kinescope control grid 16 via lead 17 is variable gain video amplifier 19 which may be of any known variety capable of having the linearity of its response characteristics varied in order to provide "distortion" of an input wave in accordance with desired amplitude distortion or non-linearity to be attributed to such wave. An example of an amplifier suitable for use herein is that disclosed and claimed in U. S. Patent 2,597,630 granted to H. French, May 20, 1952 for "Signal Shaping Circuits and Method" and assigned to the assignee of the present invention. Such amplifiers have been referred to in the art as "Gamma" amplifiers. The input terminal 19′ of amplifier 19 is or may be in the form of a movable switch member adapted to make contact selectively with the output of either the above-mentioned video signal source 20 or to the output terminal of a signal generator 21.

While not shown specifically, the signal generator 21 may comprise suitable circuitry for providing a substantially linear sawtooth waveform such as is illustrated by curve (*a*) of Figure 2, along with horizontal and vertical blanking pulses 50 and 52, respectively. As will be understood, the horizontal blanking pulses 50 (curve (*b*) of Figure 2) occur at the horizontal or line frequency which, according to present-day standards, is 15,750 cycles per second, while the vertical blanking pulses 52 occur at the field frequency of, for example, 60 cycles per second. Thus, the signal applied to the grid 16 of the recording kinescope will comprise a linearly increasing voltage combined with regularly reoccurring blanking pulses, the function of the latter being that of cutting off the electron beam during horizontal and vertical retrace thereof.

In operation, therefore, assuming that it is desired to preset the recording kinescope 10 prior to the recording of a program or other video on photographic film carried by camera 28, the input terminal 19′ of the video "predistortion" amplifier 19 is connected to the output of the signal generator 21. Hence, the electron beam will be modulated in effect by a waveform such as that shown by curve (*b*) of Figure 3 wherein the vertical frequency sawtooth is regulatory interrupted for intervals $t_1$ corresponding to the horizontal blanking pulses 50 and longer intervals (not shown) corresponding to the vertical pulses 52. With the signal from generator 21 modulating the electron beam within the kinescope, the raster formed on the screen 12 will be of such character that it gradually increases in brightness from top to bottom. Thus, the output of the photoelectric cell or other light-responsive device indicated at 34 will be generally in the form illustrated by curve (*a*) of Figure 3. In curve (*a*), it is seen that, at times $t_1$, the electron beam within the kinescope 10 has been cut off but, by virtue of the decay time of the phosphor material of screen 12, the light emitted thereby does not cease instantaneously with the commencement of the blanking pulses but rather decays exponentially, these logarithmic decays of the light emission being indicated by reference numeral 54.

The output of the photoelectric device 34 is then amplified by amplifier 36 and applied to the vertical deflection plates 38 of the cathode ray oscilloscope 40 while a suitable horizontal deflection sawtooth, furnished by generator 44, is applied to the horizontal deflection plates 42. The generator 44 may be synchronized with signal generator 21.

For optimum results, it is important that amplifier 36 together with the amplifier in the oscilloscope be a direct-coupled amplifier. The reason for the foregoing statement is that the absolute value of the voltage produced by the photocell during the blanking interval is of special concern. This voltage indicates the light output of the picture tube corresponding to an absolute "black" in the picture and must be carefully set to the proper point on the characteristic of the motion picture film stock upon which the image is being impressed. With a direct-coupled amplifier the physical position of the blanking interval on the face of the oscilloscope tube can then provide a reference point for setting the black output of the picture tube to fall at a predetermined point on the transfer characteristic of the motion picture film.

Figure 3:
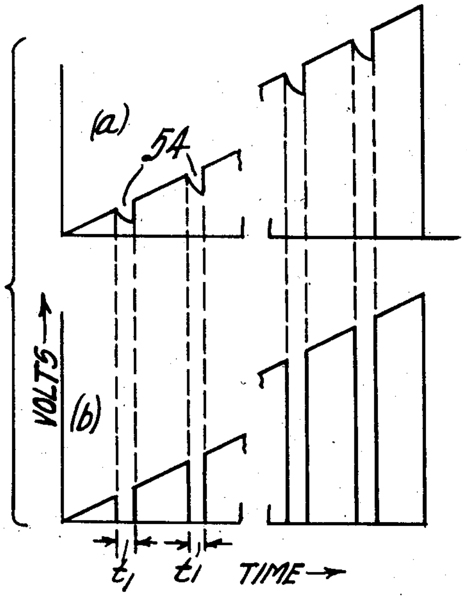
Figure 3 is additional waveforms to which reference is made in describing the operation of the invention.

In accordance with the general operation of a cathode ray oscilloscope, the image produced on its screen 41 will be a reproduction of the output of the photoelectric device as illustrated by curve (*a*) of Figure 3. As will be appreciated, the screen 41 of the oscilloscope may be provided with suitable calibration indicia so that the peak-to-peak amplitude of the waveform appearing on the screen may have a predetermined significance as to the "contrast" or gain of the video amplifier 19. Hence, assuming that the photographic film within camera 28 possess definite limits within which it is capable of reproducing tonal values, the gain of amplifier 19 may be suitably adjusted to compress or expand the sawtooth of Figure 2(*a*) such that the output of the photoelectric device appearing on the oscilloscope screen will be of the proper amplitude as an indication that the maximum and minimum amounts of light emitted by the recording kinescope 10 fall within the capacity of the film. This, as has been stated earlier, provides a convenient and accurate method of setting the "contrast" prior to the recording operation.

On the other hand, the actual vertical positioning of the sawtooth on the oscilloscope screen is determined by the D. C. level of the electron beam modulating signal of the kinescope 10, as dictated by the setting of the background control 15 in connection with the kinescope cathode 14. Thus, by raising or lowering the background control 15, the oscilloscope image may be correspondingly varied as to its vertical position as required by the characteristics of the film.

It has also been mentioned supra, and those skilled in the art will recognize the fact that in kinescope recording it is of vital importance that the luminescent screen of the kinescope have the proper decay characteristics. In other words, the persistence of the phosphor screen must not be too great, for in that event, the resulting film image would contain "banding" or "picture flicker." On the other hand, the persistence must not be too short or the total light energy of the kinescope will be insufficient to expose the film properly. Referring to waveform (*a*) of Figure 3 which represents the output of the light sensitive device 34, it will be appreciated that the amplitude of the notches 54 resulting from the horizontal blanking of the kinescope electron beam is an indication of the decay time of the phosphor screen 12. That is to say, the greater the amplitude of these notches, the shorter the decay time of the screen and vice versa. Therefore, by observing this aspect of the oscilloscope image, the operator is in a position to judge whether the decay time of the kinescope screen falls within acceptable limits, as explained above.

Another extremely important setting of the recording kinescope is its beam focus (not shown) which may, in conventional cases, comprise an electrostatic focusing electrode having, for example, a small aperture.

As the voltage on this electrode is adjusted to an optimum focus point, the greatest proportion of the beam electrons go through the aperture and ultimately strike the sceren of the picture tube. On the other hand, as the voltage on this electrode is changed to give an out-of-focus image on the screen, only a very small proportion of the beam electrons is then going through the restraining aperture. Thus the operation of the focusing anode in effect controls the average value of the beam current that reaches the screen of the picture tube. Hence, when the kinescope is properly focused, the greatest number of beam electrons will reach the tube and so give the brightest picture. This may conveniently be observed by noting the amplitude of the 15,000 cycle component present in the signal displayed on the oscilloscope.

It is often desirable and necessary to correct for nonlinearity of response of the recording kinescope in order to produce proper tonal values on the recording film. For example, the phosphor or other luminescent screen of the usual kinescopes have a characteristic light image which "sags" from a linear characteristic. Thus, it is desirable to predistort the input to the kinescope in order to compensate for such nonlinearity and this may be accomplished by providing such input signal with an oppositely non-linearized aspect such that the resultant of the two distortions provides substantial linearity. Thus, it will be recognized that, by observing the image of the sawtooth on the oscilloscope screen 41, the operator may adjust the distortion amplifier 19 until the desired linearity sawtooth appears on the oscilloscope. Although this phase of the invention has been described in accordance with an illustrative example wherein the aim is that of linearizing the light output characteristics of the kinescope, it will be appreciated that the invention is equally applicable to instances wherein certain predetermined nonlinear dynamic transfer characteristics are required, since the distortion amplifier 19 may, in such cases, be varied until the oscilloscope image possesses the requisite non-linearity.

If the mirror 30 is, as described above, of the semi-silvered variety, it need not be removed from the path of light from kinescope to camera during recording. Otherwise, the mirror may be suitably mounted so that it may be removed from this light path after the checking and adjustment of the kinescope controls have been effected. In order to record a program, it is, of course, also necessary to connect the receiver 20 to the input of the amplifier 19, in place of the signal generator.

In view of the foregoing, it will be apparent that while the invention has been set forth by way of illustrating its effectiveness with respect to certain usual settings for a recording kinescope, its scope is not limited by these examples.

Having thus described my invention, what I claim as new and desire to secure by Letters Patent is:

1. Test apparatus for a cathode ray tube having a target adapted to emit light when bombarded by electrons and means including a control electrode for directing an electron beam toward said target which comprises: means for impressing a predetermined voltage waveform which varies in amplitude repetitively at a fixed frequency upon said electrode whereby to modulate the intensity of such electron beam, said voltage waveform including pulses of substantially higher frequency than said first-named frequency and of such polarity as to substantially interrupt electron flow during their occurrence; light-responsive means disposed in light receiving relation to said target and adapted to generate a voltage proportional to the instantaneous light output of said target; and means for producing an oscillogram of the output of said light-responsive means, whereby to furnish a visual indication of the signal-input-versus-light-output characteristic of such tube.

2. Test apparatus as set forth in claim 1 including means for varying the amplitude of said predetermined voltage waveform.

3. Test apparatus for a cathode ray tube having a target adapted to emit light when bombarded by electrons and means including a control electrode for directing an electron beam toward said target which comprises: means for impressing a predetermined voltage waveform of fixed frequency upon said electrode whereby to modulate the intensity of such electron beam, said voltage waveform including pulses of substantially higher frequency than said first-named frequency and of such polarity as to substantially interrupt electron flow during their occurrence; light-responsive means disposed in light receiving relation to said target and adapted to generate a voltage proportional to the light output of said target; means for producing an oscillogram of the output of said light-responsive means; and means for distorting said predetermined voltage waveform prior to its impression upon said control electrode, whereby to vary the light output pattern of said cathode ray tube.

4. In a kinescope recording arrangement wherein image signals from a source are reconstructed on the luminescent screen of a cathode ray tube and recorded on photographic film, setup apparatus comprising, in combination: a cathode ray tube having a luminescent target adapted to emit light in response to electron bombardment and means including a beam intensity controlling electrode for directing an electron beam toward such target; means for producing deflection of such beam in a first direction at a high frequency and in a second direction perpendicular to such first direction at a substantially lower frequency; means for generating a voltage waveform of said lower frequency and of predetermined wave shape; means having selectively variable signal transfer characteristics, said means having an output terminal coupled to said beam intensity controlling electrode and an input terminal adapted for connection to said waveform generating means whereby to impress such waveform upon said electrode; light responsive means adapted to generate a signal proportional to the light output of said cathode ray tube; oscilloscope means having normally disposed first and second beam deflection means; and means coupling the signal from said light responsive means to one of said first and second oscilloscope beam deflection means in such manner as to produce a visual display of such signal whereby to indicate proper setting for said selectively variable signal transfer means.

5. In a kinescope recording arrangement wherein image signals from a source are reconstructed on the luminescent screen of a cathode ray tube and recorded on photographic film, setup apparatus comprising, in combination: a cathode ray tube having a luminescent target adapted to emit light in response to electron bombardment, and means including a beam intensity controlling electrode for directing an electron beam toward such target; means for producing deflection of such beam in a first direction at a high frequency and in a second direction perpendicular to such first direction at a substantially lower frequency; a source of image signals to be recorded; means for generating a voltage waveform of said lower frequency and of predetermined wave shape; means having selectively variable signal transfer characteristics, said means having an output terminal coupled to said beam intensity controlling electrode and an input terminal adapted for connection to said waveform generating means whereby to impress such waveform upon said electrode; light responsive means adapted to generate a signal proportional to the light output of said cathode ray tube; oscilloscope means having normally disposed first and second beam deflection means; and means coupling the signal from said light responsive means to one of said first and second oscilloscope beam deflection means in such manner as to produce a visual display of such signal whereby to indicate proper setting for said selectively variable signal transfer means, said input terminal of said signal transfer means being adapted for connection to said source of image signals.

6. In a kinescope recording arrangement wherein image signals from a source are reconstructed on the luminescent screen of a cathode ray tube and recorded on photographic film, setup apparatus comprising, in combination: a cathode ray tube having a luminescent target adapted to emit light in response to electron bombardment, and means including a beam intensity controlling electrode for directing an electron beam toward such target; means for producing deflection of such beam in a first direction at a high frequency and in a second direction perpendicular to such first direction at a substantially lower frequency; a source of image signals to be recorded; means for generating a voltage waveform of said lower frequency and of predetermined wave shape; means having selectively variable signal transfer characteristics, said means having an output terminal coupled to said beam intensity controlling electrode and an input terminal adapted for connection to said waveform generating means whereby to impress such waveform upon said electrode; light responsive means adapted to generate a signal proportional to the light output of said cathode ray tube; oscilloscope means; means coupling the signal from said light responsive means to said oscilloscope in such manner as to produce an oscillogram of such signal from said light responsive means whereby to indicate proper setting for said selectively variable signal transfer means; and means including said selectively variable signal transfer means for applying image signals from said source to said electrode.

References Cited in the file of this patent

UNITED STATES PATENTS

| | | |
|---|---|---|
| 2,460,471 | Schade | Feb. 1, 1949 |
| 2,580,083 | Doba et al. | Dec. 25, 1951 |
| 2,702,158 | Winter | Feb. 15, 1955 |
| 2,719,247 | Bedford | Sept. 27, 1955 |